US008416231B2

(12) United States Patent
Jeong et al.

(10) Patent No.: US 8,416,231 B2
(45) Date of Patent: Apr. 9, 2013

(54) LIQUID CRYSTAL DISPLAY

(75) Inventors: Youngmin Jeong, Gyeonggi-do (KR); Hongman Moon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 294 days.

(21) Appl. No.: 12/849,394

(22) Filed: Aug. 3, 2010

(65) Prior Publication Data

US 2011/0032241 A1 Feb. 10, 2011

(30) Foreign Application Priority Data

Aug. 10, 2009 (KR) ........................ 10-2009-0073384

(51) Int. Cl.
*G06F 3/038* (2006.01)
*G06F 3/041* (2006.01)

(52) U.S. Cl.
USPC .......................................... 345/212; 345/178

(58) Field of Classification Search .................... 345/87, 345/212, 173, 178; 257/72
See application file for complete search history.

(56) References Cited

U.S. PATENT DOCUMENTS

| | | | | |
|---|---|---|---|---|
| 2005/0139837 | A1* | 6/2005 | Lee et al. | 257/72 |
| 2007/0296658 | A1* | 12/2007 | Kim | 345/87 |
| 2008/0225036 | A1 | 9/2008 | Song et al. | |
| 2010/0159785 | A1 | 6/2010 | Lee et al. | |

FOREIGN PATENT DOCUMENTS

| | | | |
|---|---|---|---|
| CN | 1637561 | A | 7/2005 |
| CN | 101093327 | A | 12/2007 |
| CN | 101266762 | A | 9/2008 |
| CN | 101334564 | A | 12/2008 |

OTHER PUBLICATIONS

Office Action (w/translation) dated Mar. 31, 2012 from The Statement Intellectual Property Office of the People's Republic of China in a Chinese counterpart application.
Notification of the Second Office Action dated Jan. 22, 2013 from the State Intellectual Property Office of the People's Republic of China in counterpart application No. 201010220699.4.

* cited by examiner

*Primary Examiner* — Michael Faragalla
(74) *Attorney, Agent, or Firm* — Morgan, Lewis & Bockius LLP

(57) ABSTRACT

A liquid crystal display includes a liquid crystal display panel on which a plurality of first units each including at least one liquid crystal cell and a plurality of second units each including at least one liquid crystal cell are positioned in a display area and data line and gate lines cross one another, a common voltage generation unit generating first and second common voltages, a plurality of first longitudinal common lines that supply the first common voltage input through a plurality of first input units to each of first common electrodes of the first units, and a plurality of second longitudinal common lines that supply the second common voltage input through a plurality of second input units to each of second common electrodes of the second units.

11 Claims, 12 Drawing Sheets

FIG. 3B
Generation of
luminance
difference

LIQUID CRYSTAL DISPLAY

This application claims the benefit of Korean Patent Application No. 10-2009-0073384 filed on Aug. 10, 2009, which is incorporated herein by reference for all purposes as if fully set forth herein.

BACKGROUND OF THE INVENTION

1. Field of the Invention

Embodiments of the invention relate to a liquid crystal display capable of reducing a distortion of a common voltage.

2. Discussion of the Related Art

An active matrix type liquid crystal display displays a motion picture using a thin film transistor (TFT) as a switching element. The active matrix type liquid crystal display has been implemented in televisions as well as display devices in portable devices such as office equipments and computers, because of the thin profile of the active matrix type liquid crystal displays. Accordingly, a cathode ray tube (CRT) is being rapidly replaced by the active matrix type liquid crystal display.

In the active matrix type liquid crystal display, a data voltage is applied to pixel electrodes, and a common voltage is applied to common electrodes opposite the pixel electrodes. The common electrodes are connected in parallel to common lines. Liquid crystal cells are driven by the voltages applied to the pixel electrodes and the common electrodes.

However, the common voltage is easily distorted by a deviation between resistances of the common lines or a deviation between the common voltages over the entire surface of a liquid crystal display panel based on a structure of the common lines. For example, in a liquid crystal display in which as many common lines as the number of horizontal lines (i.e., a vertical resolution) are formed parallel to gate lines, because a data voltage is simultaneously applied to pixels of 1 horizontal line through the supply of scan pulses, a load of the common lines opposite the pixels increases. Because the load of the common lines depends on an amount of RC delay defined by a multiplication of a resistance and a parasitic capacitance of the common line, the resistances of the common lines have to be reduced so as to reduce the amount of RC delay. However, as shown in FIG. 1, because a related art liquid crystal display is configured to receive a common voltage Vcom through only two input sources, it is limited to a reduction in resistances of common lines. As a result, as shown in FIG. 2A, the common voltage Vcom is not kept constant and is affected by a scan pulse SP or a data voltage Vdata. Hence, a ripple phenomenon is generated in the common voltage Vcom. The ripple phenomenon of the common voltage Vcom is a main cause generating a horizontal crosstalk when a specific data pattern is displayed on the screen as shown in FIG. 3A.

In the related art liquid crystal display, as the common lines go from right and left sides of the liquid crystal display panel to a middle portion of the liquid crystal display panel, the resistances of the common lines increase because of the structure of the common lines shown in FIG. 1. Therefore, as shown in FIG. 2B, a deviation of the common voltage Vcom over the entire surface of the liquid crystal display panel is caused. As shown in FIG. 3B, the deviation of the common voltage Vcom causes a difference between luminances of upper and lower portions of the liquid crystal display panel and a flicker, and also accumulates DC components inside the panel to thereby generate image sticking. In most of liquid crystal displays, common lines formed at edges (i.e., a non-display area outside a pixel array) of a liquid crystal display panel are configured to have a wide width so as to reduce the resistances of the common lines. However, it is limited to a reduction in the resistances of the common lines because of a limitation in the size of the non-display area. Further, there is a relatively large deviation between resistances of the common lines depending on a location of the common lines.

Further, because the related art liquid crystal display uses a DC level common voltage, a voltage corresponding to one half of a high potential power voltage input to a data driver integrated circuit (IC) may be used as a liquid crystal driving voltage in an inversion scheme. In other words, the data driver IC requires an output voltage equal to or greater than two times the liquid crystal driving voltage. Hence, it is difficult to secure a driving voltage margin of the data driver IC and to reduce a power consumed in the data driver IC.

SUMMARY OF THE INVENTION

Embodiments of the invention provide a liquid crystal display capable of reducing a distortion of a common voltage and reducing a power consumed in a data driver integrated circuit (IC).

In one aspect, there is a liquid crystal display comprising a liquid crystal display panel on which a plurality of first units each including at least one liquid crystal cell and a plurality of second units each including at least one liquid crystal cell are positioned in a display area and a plurality of data line and a plurality of gate lines cross one another, a common voltage generation unit configured to generate a first common voltage and a second common voltage, a plurality of first longitudinal common lines configured to supply the first common voltage input through a plurality of first input units to each of first common electrodes of the plurality of first units, and a plurality of second longitudinal common lines configured to supply the second common voltage input through a plurality of second input units to each of second common electrodes of the plurality of second units, wherein each of the plurality of first longitudinal common lines is connected to at least one of the first common electrodes through a first thin film transistor (TFT), and wherein each of the plurality of second longitudinal common lines is connected to at least one of the second common electrodes through a second TFT.

The first common voltage and the second common voltage may be swung in opposite directions every predetermined period of time.

The predetermined period of time may be k horizontal period, where k is a natural number.

The first common electrodes that are not directly connected to the first TFT may be electrically connected to the at least one first common electrode directly connected to the first TFT. The second common electrodes that are not directly connected to the second TFT may be electrically connected to the at least one second common electrode directly connected to the second TFT.

The first and second longitudinal common lines may be formed in a direction parallel to the data lines.

The liquid crystal display may further comprise a first edge common line configured to be formed in a non-display area outside the display area of the liquid crystal display panel and configured to electrically connects the first input units to the first longitudinal common lines, and a second edge common line configured to be formed independently of the first edge common line in the non-display area and configured to electrically connects the second input units to the second longitudinal common lines.

The liquid crystal display may further comprise a plurality of source tape carrier packages (TCPs) on which data driver integrated circuits (ICs) for driving the data lines are respectively mounted. The first input units include a dummy channel at one side of each of the plurality of source TCPs, and the second input units include a dummy channel at the other side of each of the plurality of source TCPs.

The first and second edge common lines may be formed using the same metal pattern as the gate lines. The first and second longitudinal common lines may be formed using the same metal pattern as the data lines.

Each of the first and second edge common lines may have a line width greater than the gate lines. Each of the first and second longitudinal common lines may have a line width less than the data lines.

The liquid crystal display may further comprise a storage line configured to cross the first and second longitudinal common lines at a right angle in the liquid crystal cells of the first and second units and configured to receive a voltage of a constant level, and a shield pattern configured to extend from the storage line along the data lines or the first and second longitudinal common lines in an outside area of the liquid crystal cells of the first and second units.

When a resolution of a liquid crystal cell array including the liquid crystal cells of the first and second units is m×n, where m and n are a natural number, 3m/2 data lines and 2n gate lines may be formed on the liquid crystal display panel. In this case, a gate pulse having a width corresponding to ½ horizontal period synchronized with a data voltage may be sequentially supplied to the gate lines.

When a resolution of a liquid crystal cell array including the liquid crystal cells of the first and second units is m×n, where m and n are a natural number, m data lines and 3n gate lines may be formed on the liquid crystal display panel. In this case, a gate pulse having a width corresponding to ⅓ horizontal period synchronized with a data voltage may be sequentially supplied to the gate lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
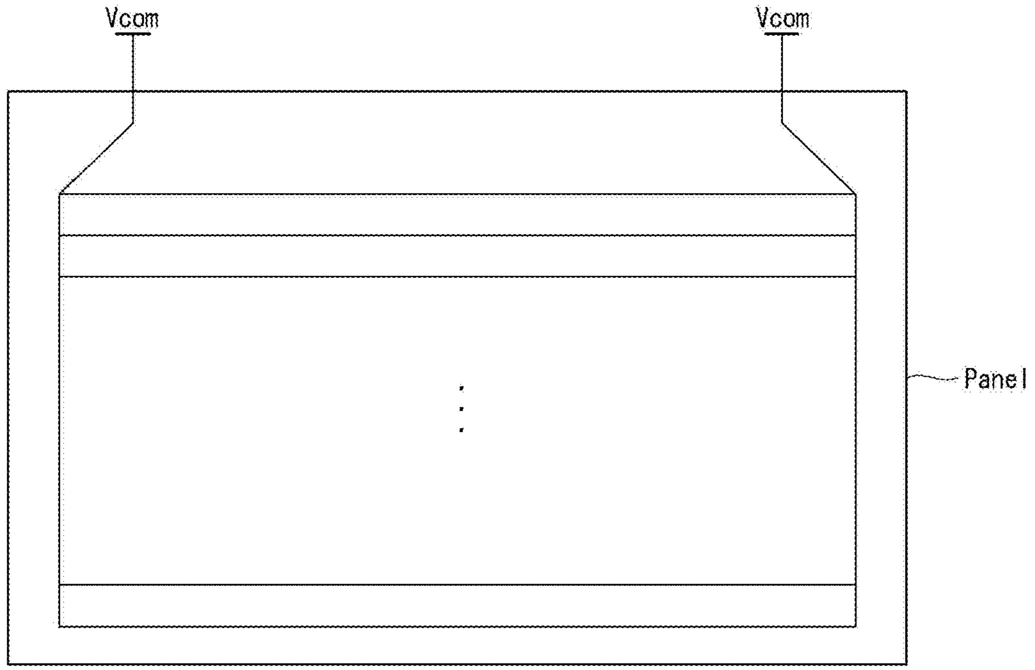
FIG. 1 (RELATED ART)
FIG. 1 illustrates a connection structure of related art common lines.
Figure 2A:
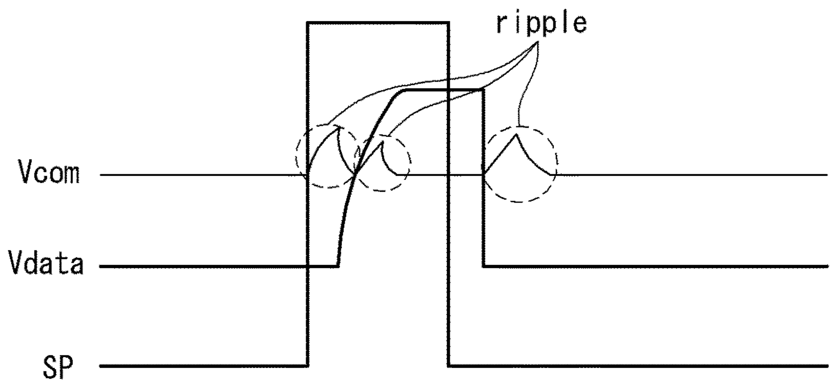
FIG. 2A (RELATED ART)
FIG. 2A illustrates a ripple phenomenon resulting from resistances of related art common lines.
Figure 2B:
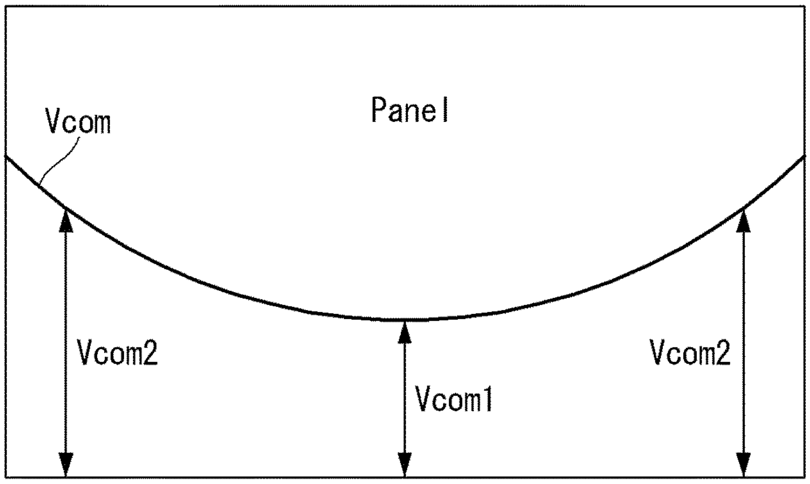
FIG. 2B (RELATED ART)
FIG. 2B illustrates a deviation of a common voltage over the entire surface of a related art liquid crystal display panel.
Figure 3A:
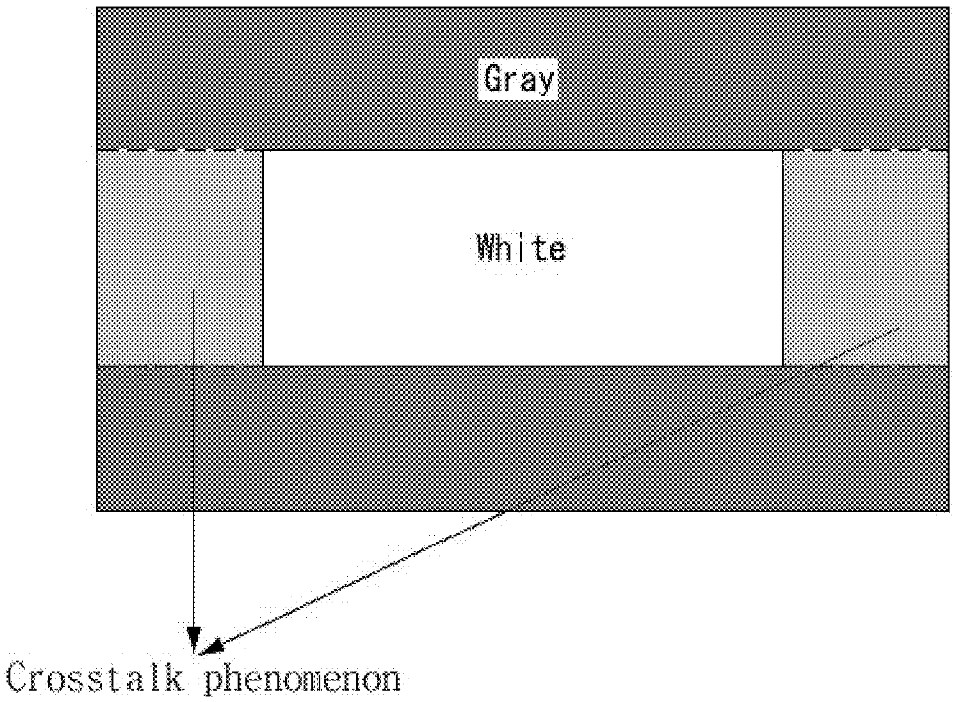
FIG. 3A (RELATED ART)
FIG. 3A illustrates a crosstalk phenomenon resulting from an instability of a common voltage in a related art liquid crystal display.
Figure 3B:
FIG. 3B (RELATED ART)
FIG. 3B illustrates a luminance difference resulting from an instability of a common voltage in a related art liquid crystal display.
Figure 4:
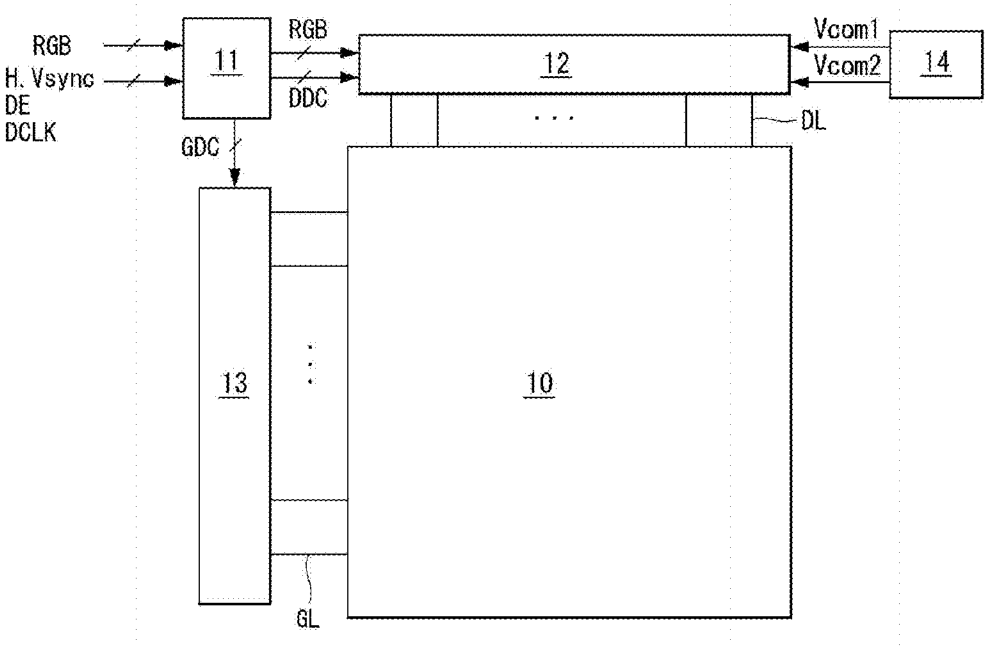
FIG. 4 is a block diagram illustrating a liquid crystal display according to an exemplary embodiment of the invention.

FIG. 4 illustrates a liquid crystal display according to an exemplary embodiment of the invention. As shown in FIG. 4, a liquid crystal display according to an exemplary embodiment of the invention includes a liquid crystal display panel 10, a timing controller 11, a data driving circuit 12, a gate driving circuit 13, and a common voltage generation unit 14.

The liquid crystal display panel 10 includes an upper glass substrate, a lower glass substrate, and a liquid crystal layer between the upper and lower glass substrates. The liquid crystal display panel 10 includes a plurality of liquid crystal cells arranged in a matrix form based on a crossing structure of a plurality of data lines DL and a plurality of gate lines GL.

The data lines DL, the gate lines GL, thin film transistors (TFTs), the liquid crystal cells that are connected to the TFTs and are driven by an electric field generated between pixel electrodes and common electrodes, storage capacitors, and the like are formed on the lower glass substrate of the liquid crystal display panel 10. A common line includes a first common line and a second common line that are electrically separated from each other. A first common voltage Vcom1 and a second common voltage Vcom2 are supplied to the first common line and the second common line, respectively. The first common voltage Vcom1 and the second common voltage Vcom2 are swung in opposite directions every predetermined period of time. The first common line includes a first edge common line formed at edges (i.e., a non-display area) of the lower glass substrate in a direction parallel to the gate lines GL and a plurality of first longitudinal common lines connected to the first edge common line in a direction parallel to the data lines DL. The second common line includes a second edge common line formed at the edges (i.e., the non-display area) of the lower glass substrate in the direction parallel to the gate lines GL and a plurality of second longitudinal common lines connected to the second edge common line in the direction parallel to the data lines DL. The first and second common lines are electrically connected to an output terminal of the common voltage generation unit 14 and are electrically connected to the common electrodes.

A black matrix, a color filter, the common electrodes are formed on the upper glass substrate of the liquid crystal display panel 10. In a vertical electric field drive manner such as a twisted nematic (TN) mode and a vertical alignment (VA) mode, the common electrodes are formed on the upper glass substrate. In a horizontal electric field drive manner such as an in-plane switching (IPS) mode and a fringe field switching (FFS) mode, the common electrodes and the pixel electrodes are formed on the lower glass substrate.

Polarizing plates crossing optical axes at a right angle are attached respectively to the upper and lower glass substrates of the liquid crystal display panel 10. Alignment layers for setting a pre-tilt angle of the liquid crystals in an interface contacting the liquid crystals are respectively formed on the upper and lower glass substrates.

The timing controller 11 receives timing signals, such as horizontal and vertical sync signals Hsync and Vsync, a data enable signal DE, and a dot clock DCLK to generate a data control signal DDC for controlling operation timing of the data driving circuit 12 and a gate control signal GDC for controlling operation timing of the gate driving circuit 13. The data control signal DDC includes a source start pulse SSP, a source sampling clock SSC, a source output enable signal SOE, a polarity control signal POL, and the like. The gate control signal GDC includes a gate start pulse GSP, a gate shift clock GSC, a gate output enable signal GOE, and the like.

The data driving circuit 12 includes a plurality of data driver integrated circuits (ICs). Each of the data driver ICs latches digital video data RGB under the control of the timing controller 11 and then converts the latched digital video data RGB into positive and negative analog data voltages. Each data driver IC then supplies the positive/negative analog data voltage to the data lines DL. The data driver ICs are mounted on a source tape carrier package (TCP) for electrically connecting a source printed circuit board (PCB) to the liquid crystal display panel 10. A source chip-on-film (COF) may replace the source TCP. The source TCP connects the data driver ICs to the data lines DL using a plurality of effective channels. Further, the source TCP connects the common voltage generation unit 14 to the common line using dummy channels at both sides of each effective channel.

The gate driving circuit 13 includes a plurality of gate driver ICs. The gate driver ICs supply a scan pulse to the gate lines GL under the control of the timing controller 11.

Figure 5:
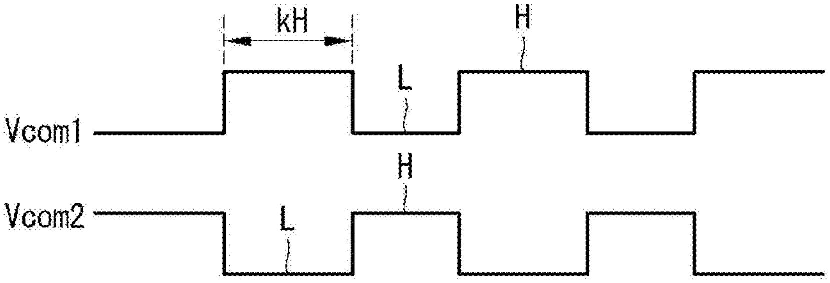
FIG. 5 is a waveform diagram of first and second common voltages according to an exemplary embodiment of the invention.

The common voltage generation unit 14 generates the first and second common voltages Vcom1 and Vcom2 each having a different voltage level. The first and second common voltages Vcom1 and Vcom2 are swung between two voltage levels H and L in opposite directions every predetermined period of time. For example, as shown in FIG. 5, if the first common voltage Vcom1 moves up or down every k horizontal period kH, the second common voltage Vcom2 moves up or down every k horizontal period kH in the opposition direction to the movement of the first common voltage Vcom1, where k is a natural number. Levels of the first and second common voltages Vcom1 and Vcom2 are inverted every one frame period. Because a potential of the liquid crystal cells is determined by whether the data voltage is greater or less than the common voltage, the liquid crystal cells to which the common voltage of a high voltage level is applied are negatively charged, and the liquid crystal cells to which the common voltage of a low voltage level is applied are positively charged. Hence, a swing width of the data voltage for an inversion drive is reduced to ½ of a swing width of the data voltage when the common voltage of a constant level is supplied. A reduction in the swing width of the data voltage results in a reduction in power consumption of the data drive ICs and an increase in response time of the liquid crystals. Hence, a driving margin of the liquid crystals increases, and heat generated in the data driver ICs is reduced. A method for preventing a distortion of the common voltage to stabilize the common voltage is demanded so as to apply a common voltage swing manner. A method for reducing the distortion of the common voltage is described below.

Figure 6:
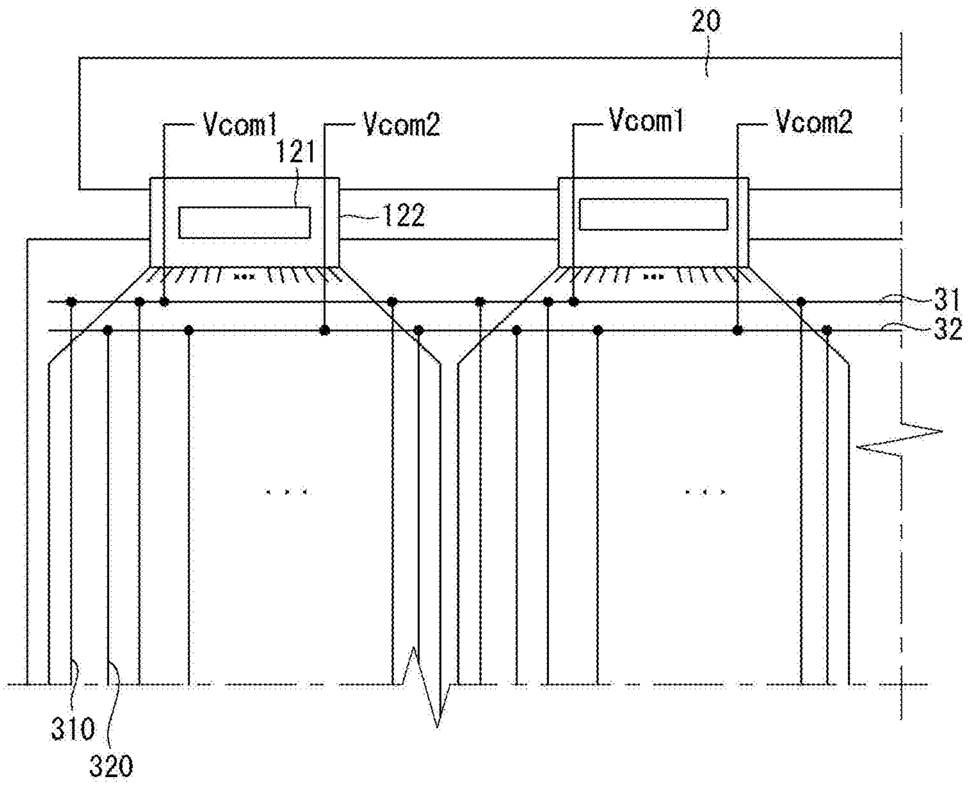
FIG. 6 is a plane view of first and second common lines according to an exemplary embodiment of the invention.
Figure 7:
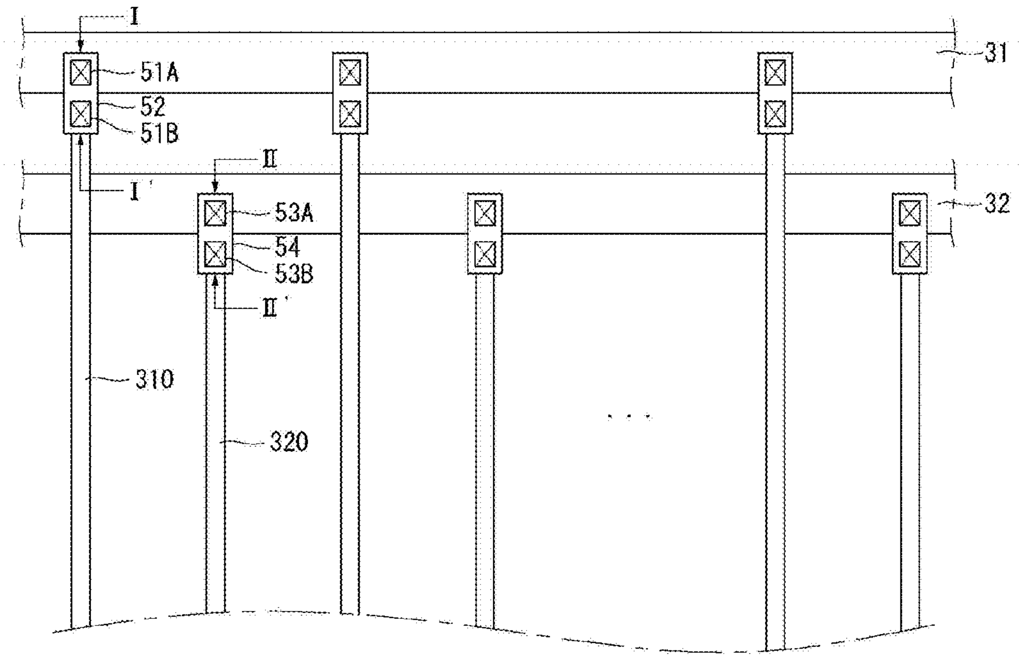
FIG. 7 is a plane view showing in detail a portion of the first and second common lines shown in FIG. 6.
Figure 8:
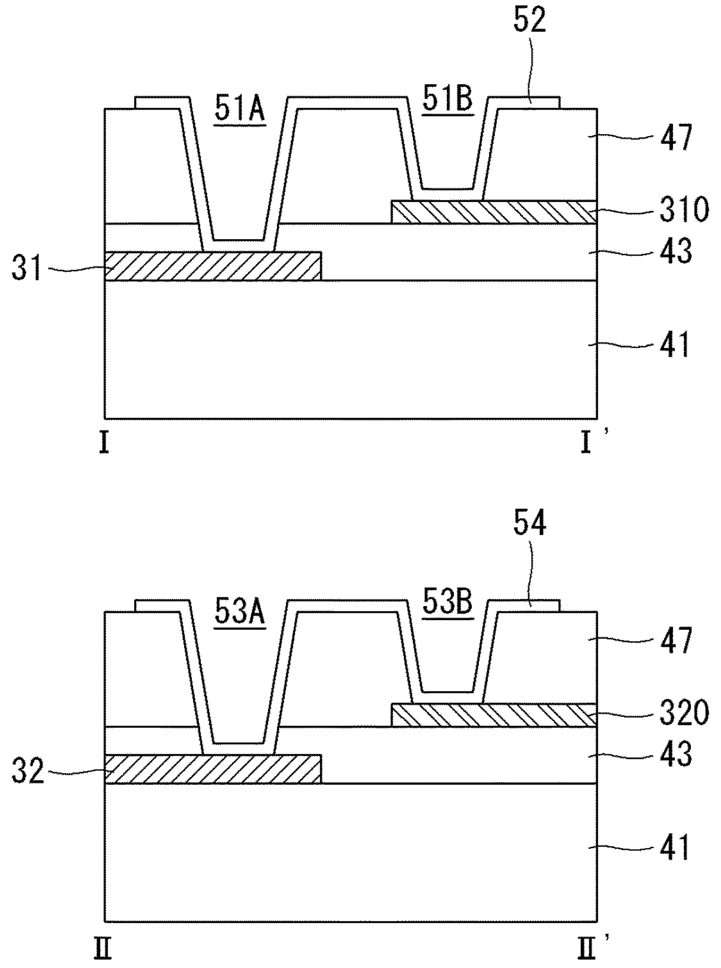
FIG. 8 is a cross-sectional view taken along lines I-I' and II-II' of FIG. 7.

FIG. 6 is a plane view of the first and second common lines according to the exemplary embodiment of the invention. FIG. 7 is a plane view showing in detail a portion of the first and second common lines shown in FIG. 6. FIG. 8 is a cross-sectional view taken along lines I-I' and II-II' of FIG. 7. In FIG. 8, a reference numeral 41 denotes the lower glass substrate, 43 a gate insulating layer, and 47 a passivation layer.

As shown in FIG. 6, the common line includes a first common line and a second common line that are electrically separated from each other. The first common line includes a first edge common line 31 formed at edges of the lower glass substrate and a plurality of first longitudinal common lines 310 commonly connected to the first edge common line 31 in a direction parallel to the data lines. The second common line includes a second edge common line 32 formed at the edges of the lower glass substrate and a plurality of second longitudinal common lines 320 commonly connected to the second edge common line 32 in the direction parallel to the data lines DL.

As shown in FIG. 6, the first edge common line 31 receives the first common voltage Vcom1 through a dummy channel of one side of a source TCP 122 on which a data driver IC 121 is mounted, and the second edge common line 32 receives the second common voltage Vcom2 through a dummy channel of the other side of the source TCP 122 on which the data driver IC 121 is mounted. In the exemplary embodiment of the invention, the number of input sources used to input the first and second common voltages Vcom1 and Vcom2 increases by the number of the source TCPs 122. Thus, a deviation of the first and second common voltages Vcom1 and Vcom2 over the entire surface of the liquid crystal display panel 10 can be greatly reduced, and resistances of the first and second edge common lines 31 and 32 can be greatly reduced. The first and second edge common lines 31 and 32 may be formed of the same material as the gate lines. The first and second edge common lines 31 and 32 may be manufactured to be thicker than the gate lines so as to reduce line resistances of the first and second common voltages Vcom1 and Vcom2. In FIG. 6, a reference numeral 20 denotes a source PCB.

As shown in FIGS. 7 and 8, the first longitudinal common line 310 is electrically connected to the first edge common line 31 through first and second contact holes 51A and 51B and a first connection pattern 52. The first connection pattern 52 is connected to the first edge common line 31 through the first contact hole 51A and is connected to the first longitudinal common line 310 through the second contact hole 51B. The second longitudinal common line 320 is electrically connected to the second edge common line 32 through third and fourth contact holes 53A and 53B and a second connection pattern 54. The second connection pattern 54 is connected to the second edge common line 32 through the third contact hole 53A and is connected to the second longitudinal common line 320 through the fourth contact hole 54B. The first and second longitudinal common lines 310 and 320 may be formed of the same material as the data lines. The first and second longitudinal common lines 310 and 320 may be manufactured to be thinner than the data lines so as to prevent a reduction of an aperture ratio in a pixel array.

As described above, because the liquid crystal display according to the exemplary embodiment of the invention includes the common line including the edge common lines 31 and 32 having a relatively large line width and the longitudinal common lines 310 and 320 having a relatively small line width, a load of the common line may be dispersed and the distortion of the common voltage may be reduced. For example, because the common lines are formed in a direction parallel to the gate lines in the related art, when one horizontal line is scanned by the scan pulse, one common line is affected by the data voltages applied to all the liquid crystal cells on the one horizontal line. However, in the exemplary embodiment of the invention, when one horizontal line is scanned by the scan pulse, only the data voltage applied to predetermined liquid crystal cells sharing the common voltages Vcom1 and Vcom2 affects the longitudinal common lines 310 and 320. Thus, a load of the common lines is greatly dispersed. Furthermore, in the exemplary embodiment of the invention, because the common voltages Vcom1 and Vcom2 are applied to the common electrodes of the liquid crystal cells through the TFTs, the common voltages Vcom1 and Vcom2 may be prevented from being affected by the data voltage applied to the liquid crystal cells on other horizontal lines.

The first and second longitudinal common lines 310 and 320 are alternately formed. One liquid crystal cell may be assigned to each of the alternately positioned first and second longitudinal common lines 310 and 320. Alternatively, the two or three liquid crystal cells may be assigned to each of the alternately positioned first and second longitudinal common lines 310 and 320 in consideration of a reduction in the aperture ratio resulting from the common lines.

Figure 9:
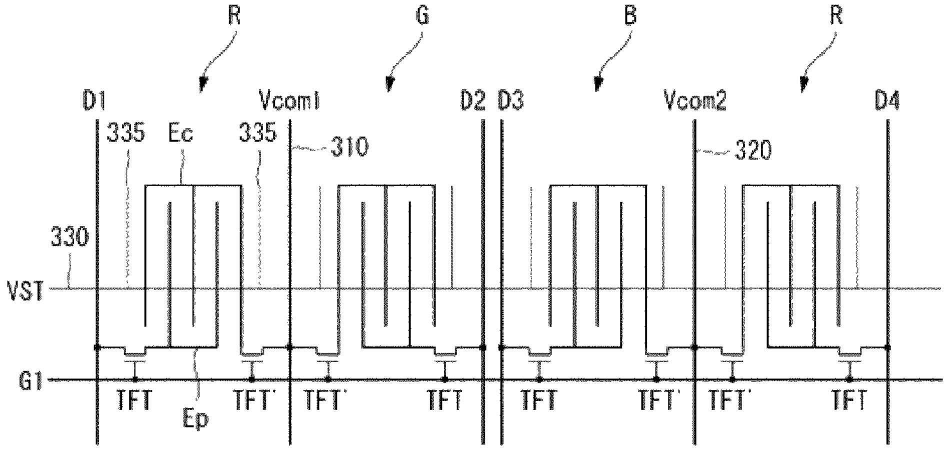
FIGS. 9 and 10 illustrate an example where first and second longitudinal common lines are alternately formed so that two liquid crystal cells are assigned to each of the first and second longitudinal common lines.
Figure 10:
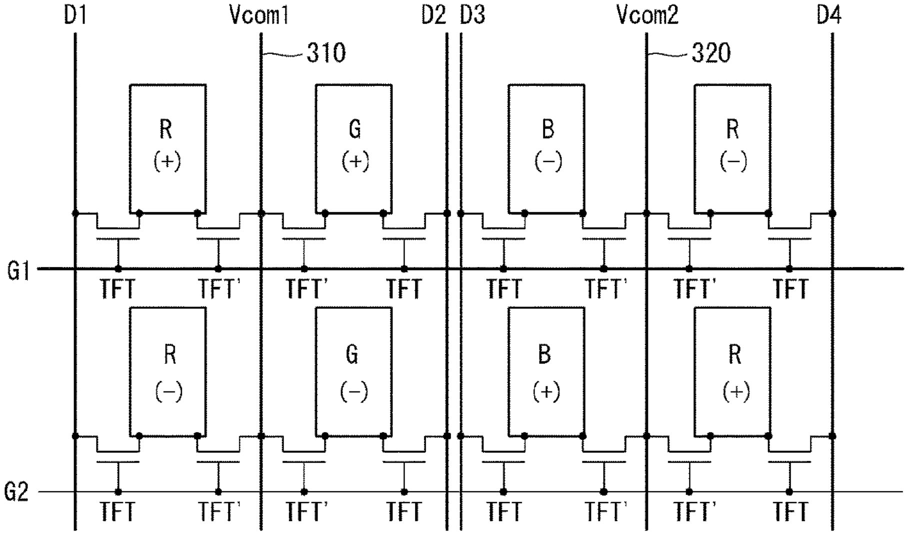

FIGS. 9 and 10 illustrate an example where the first and second longitudinal common lines 310 and 320 are alternately formed so that two liquid crystal cells are assigned to each of the first and second longitudinal common lines 310 and 320.

As shown in FIG. 9, the first longitudinal common line 310 is formed between two horizontally adjacent liquid crystal cells (i.e., R and G liquid crystal cells) (hereinafter, referred to as “first liquid crystal cells”). The first longitudinal common line 310 is connected to common electrodes Ec of the first liquid crystal cells through a common voltage supply switch TFT' of each of the first liquid crystal cells. The common electrodes Ec of the first liquid crystal cells are arranged opposite pixel electrodes Ep of the first liquid crystal cells in a horizontal direction. The pixel electrodes Ep of the first liquid crystal cells are connected to the data lines through data voltage supply switches TFT of the first liquid crystal cells.

The second longitudinal common line 320 is formed between two horizontally adjacent liquid crystal cells (i.e., B and R liquid crystal cells) (hereinafter, referred to as “second liquid crystal cells”). The second longitudinal common line 320 is connected to common electrodes Ec of the second liquid crystal cells through a common voltage supply switch TFT' of each of the second liquid crystal cells. The common electrodes Ec of the second liquid crystal cells are arranged opposite pixel electrodes Ep of the second liquid crystal cells in a horizontal direction. The pixel electrodes Ep of the second liquid crystal cells are connected to the data lines through data voltage supply switches TFT of the second liquid crystal cells.

A storage line 330 that crosses the first and second longitudinal common lines 310 and 320 at a right angle may be further formed in all the liquid crystal cells. A storage voltage VST of a constant level is supplied to the storage line 330. The storage line 330 forms a storage capacitor in an overlap area between the storage line 330 and the pixel electrode Ep, thereby keeping a charging amount of the liquid crystal cell constant during one frame period. Further, a shield pattern 335 extending from the storage line 330 along the data lines or the first and second longitudinal common lines 310 and 320 may be further formed in an outside area of the liquid crystal cells. The shield pattern 335 shields a parasitic capacitance formed between the data lines and the pixel electrode Ep, thereby preventing changes in a potential of the pixel electrode Ep resulting from changes in a voltage of the data lines.

Each of the first and second longitudinal common lines 310 and 320 is not formed between the two horizontally adjacent liquid crystal cells and may be formed at one side of the two horizontally adjacent liquid crystal cells. In this case, the common voltage supply switch TFT' is not formed in both the two horizontally adjacent liquid crystal cells and may be formed in only the liquid crystal cell adjacent to each of the first and second longitudinal common lines 310 and 320.

Figure 11:
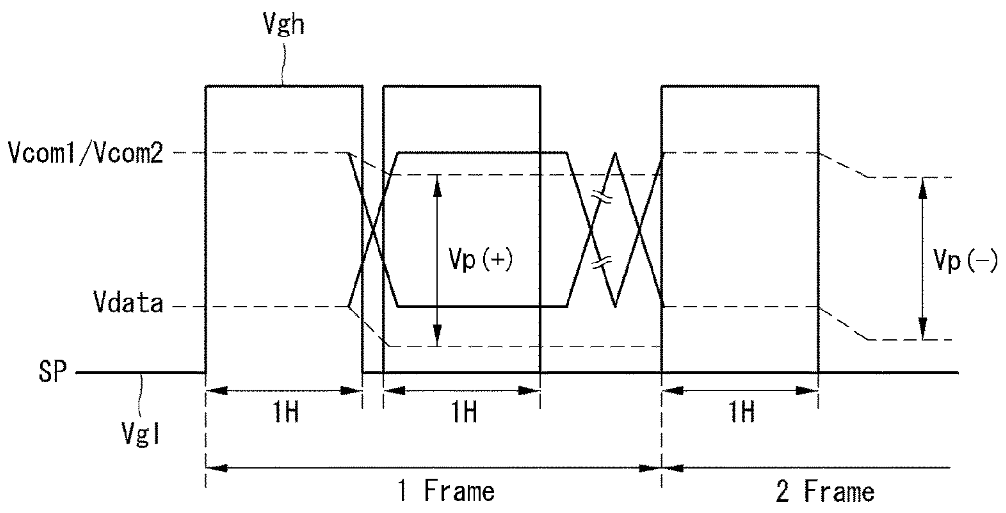
FIG. 11 is a waveform diagram illustrating first and second common voltages, a data voltage, a scan pulse, and a charging voltage.
Figure 12:
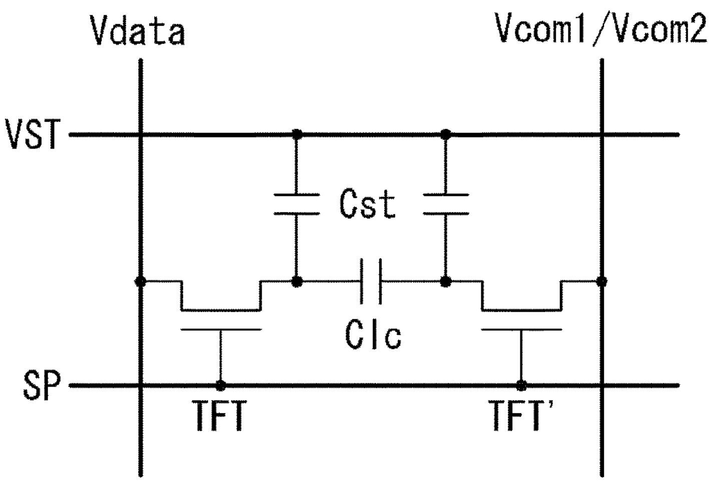
FIG. 12 is an equivalent circuit diagram of a liquid crystal display according to an exemplary embodiment of the invention.

As shown in FIG. 10, when levels of the first common voltage Vcom1 and the second common voltage Vcom2 are swung in opposite directions every one horizontal period 1H, the liquid crystal cells have a charging polarity in accordance with a horizontal 2-dot inversion manner. As shown in FIG. 11, a charging voltage Vp of the liquid crystal cells has a positive polarity when the data voltage Vdata is greater than the common voltage Vcom1/Vcom2, and has a negative polarity when the data voltage Vdata is less than the common voltage Vcom1/Vcom2. When the switches TFT and TFT' are turned on in response to a scan pulse SP of a high level Vgh, the liquid crystal cells are charged to the voltage Vp corresponding to a difference between the data voltage Vdata and the common voltage Vcom1/Vcom2. When the switches TFT and TFT' are turned off in response to the scan pulse SP of a low level Vg1, the charging voltage Vp of the liquid crystal cells Clc is floated and is uniformly held at a initial charging voltage level by the storage capacitor Cst as shown in FIG. 12.

Figure 13:
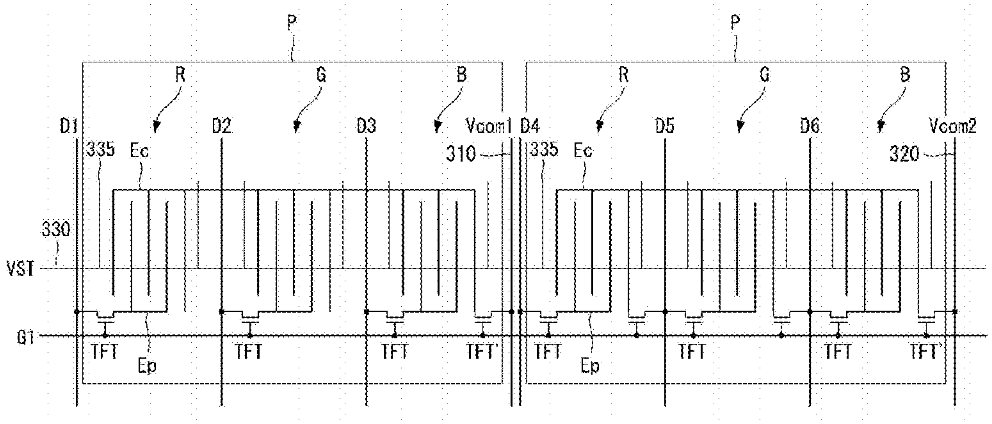
FIG. 13 illustrates an example where first and second longitudinal common lines are alternately formed so that three liquid crystal cells are assigned to each of the first and second longitudinal common lines.

FIG. 13 illustrates an example where the first and second longitudinal common lines 310 and 320 are alternately formed so that three liquid crystal cells are assigned to each of the first and second longitudinal common lines 310 and 320.

As shown in FIG. 13, the first and second longitudinal common lines 310 and 320 are alternately formed between unit pixels P each including the R, G, and B liquid crystal cells. The first longitudinal common line 310 is connected to the common electrodes Ec of the three R, G, and B liquid crystal cells assigned to the first longitudinal common line 310 through the common voltage supply switch TFT' formed in the B liquid crystal cell closest to the first longitudinal common line 310 among the R, G, and B liquid crystal cells assigned to the first longitudinal common line 310. The common electrodes Ec of the R, G, and B liquid crystal cells are electrically connected to one another. The common electrode Ec and the pixel electrode Ep of each of the R, G, and B liquid crystal cells are arranged opposite each other in a horizontal direction. The pixel electrodes Ep of the R, G, and B liquid crystal cells are connected to the data lines through their data voltage supply switches TFT.

The second longitudinal common line 320 is connected to the common electrodes Ec of the three R, G, and B liquid crystal cells assigned to the second longitudinal common line 320 through the common voltage supply switch TFT' formed in the B liquid crystal cell closest to the second longitudinal common line 320 among the R, G, and B liquid crystal cells assigned to the second longitudinal common line 320. The common electrodes Ec of the R, G, and B liquid crystal cells are electrically connected to one another. The common electrode Ec and the pixel electrode Ep of each of the R, G, and B liquid crystal cells are arranged opposite each other in a horizontal direction. The pixel electrodes Ep of the R, G, and B liquid crystal cells are connected to the data lines through their data voltage supply switches TFT.

A storage line 330 that crosses the first and second longitudinal common lines 310 and 320 at a right angle may be further formed in all the R, G, and B liquid crystal cells. A storage voltage VST of a constant level is supplied to the storage line 330. The storage line 330 forms a storage capacitor in an overlap area between the storage line 330 and the pixel electrode Ep, thereby keeping a charging amount of the liquid crystal cell constant during one frame period. Further, a shield pattern 335 extending from the storage line 330 along the data lines or the first and second longitudinal common lines 310 and 320 may be further formed in an outside area of the liquid crystal cells. The shield pattern 335 shields a parasitic capacitance formed between the data lines and the pixel electrode Ep, thereby preventing changes in a potential of the pixel electrode Ep resulting from changes in a voltage of the data lines.

When the first and second longitudinal common lines 310 and 320 are alternately formed so that three liquid crystal cells are assigned to each of the first and second longitudinal common lines 310 and 320 as shown in FIG. 13, the liquid crystal cells have a charging polarity in accordance with a horizontal 3-dot inversion manner when levels of the first common voltage Vcom1 and the second common voltage Vcom2 are swung in opposite directions every one horizontal period 1H.

Figure 14:
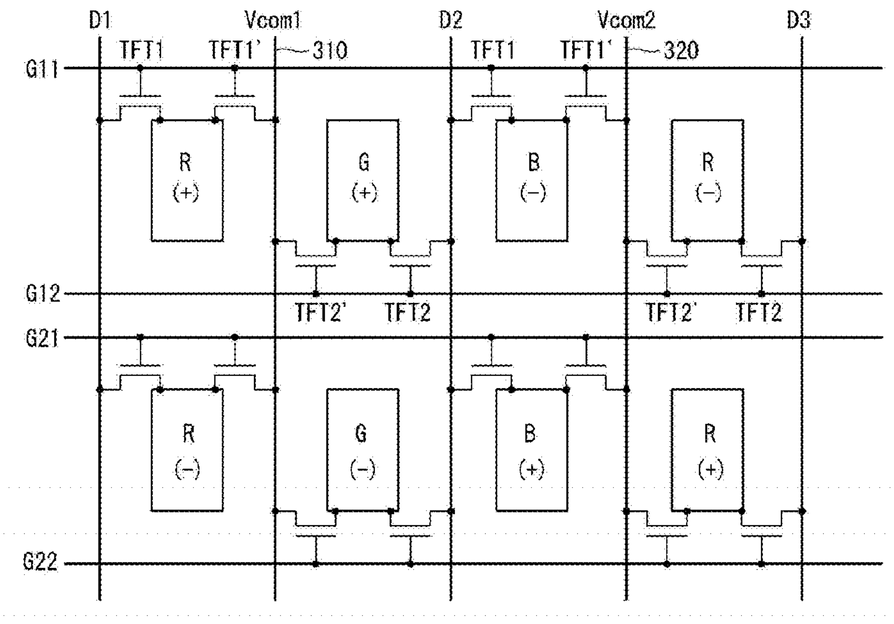
FIGS. 14 and 15 illustrate an extension example of an exemplary embodiment of the invention.
Figure 15:
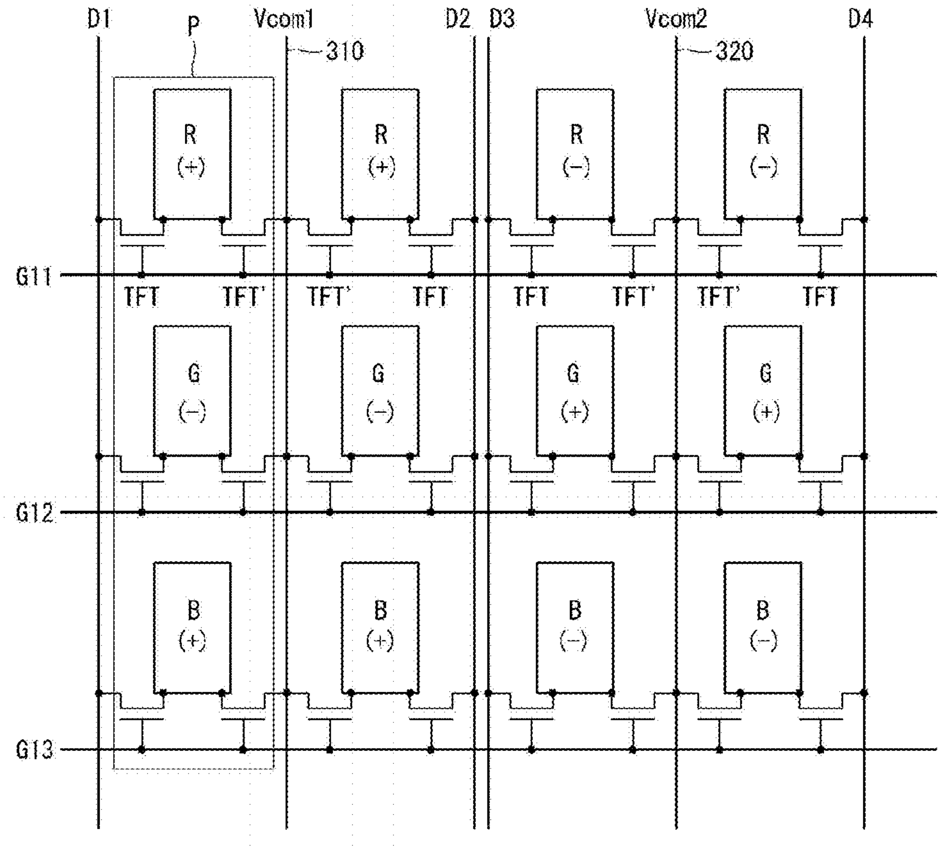

FIGS. 14 and 15 illustrate an extension example of the exemplary embodiment of the invention.

The number of data lines and the number of source driver ICs required in a liquid crystal cell array illustrated in FIG. 14 may be reduced to one half of the number of data lines and the number of source driver ICs required in each of liquid crystal cell arrays illustrated in FIGS. 9 and 13 in the same resolution. In the liquid crystal cell array illustrated in FIG. 14, the horizontally adjacent liquid crystal cells are successively charged to the data voltage, that is supplied in a time-division manner, through the same data line. Further, in the liquid crystal cell array of FIG. 14, the horizontally adjacent liquid crystal cells (i.e., the R and G liquid crystal cells) are successively charged to the first common voltage Vcom1, that is supplied in a time-division manner, through the same first longitudinal common line 310. In the liquid crystal cell array of FIG. 14, the horizontally adjacent liquid crystal cells (i.e., the B and R liquid crystal cells) are successively charged to the second common voltage Vcom2, that is supplied in a time-division manner, through the same second longitudinal common line 320. Namely, two liquid crystal cells are assigned to each of the first and second longitudinal common lines 310 and 320.

The pixel electrodes of the liquid crystal cells connected to odd-numbered gate lines G11 and G21 are connected to the data lines through a first data voltage supply switch TFT1, and the pixel electrodes of the liquid crystal cells connected to even-numbered gate lines G12 and G22 are connected to the data lines through a second data voltage supply switch TFT2. The common electrodes opposite the pixel electrodes of the liquid crystal cells connected to the odd-numbered gate lines G11 and G21 in a horizontal direction are alternately connected to the first and second longitudinal common lines 310 and 320 through a first common voltage supply switch TFT1'. Further, the common electrodes opposite the pixel electrodes of the liquid crystal cells connected to the even-numbered gate lines G12 and G22 in a horizontal direction are alternately connected to the first and second longitudinal common lines 310 and 320 through a second common voltage supply switch TFT2'.

When a resolution of the liquid crystal cell array of FIG. 14 is m×n, (m×3)/2 data lines and 2n gate lines are required, where m and n are a natural number and 3 corresponds to R, G, and B liquid crystal cells. The gate pulse of ½ horizontal period synchronized with the data voltage is sequentially supplied to the gate lines of the liquid crystal cell array of FIG. 14.

The number of data lines and the number of source driver ICs required in a liquid crystal cell array illustrated in FIG. 15 may be reduced to one third of the number of data lines and the number of source driver ICs required in each of the liquid crystal cell arrays illustrated in FIGS. 9 and 13 in the same resolution. In the liquid crystal cell array illustrated in FIG. 15, the R liquid crystal cells are arranged along a direction of a horizontal line, and the G liquid crystal cells and the B liquid crystal cells are arranged along the direction of the horizontal line in the same manner as the R liquid crystal cells. Further, unit pixels P each including the R, G, and B liquid crystal cells are arranged along a direction of a vertical line. In the liquid crystal cell array of FIG. 15, two liquid crystal cells are assigned to each of the first and second longitudinal common lines 310 and 320.

The first longitudinal common line 310 is formed between two horizontally adjacent liquid crystal cells (hereinafter, referred to as "first liquid crystal cells"). The first longitudinal common line 310 is connected to common electrodes Ec of the first liquid crystal cells through a common voltage supply switch TFT' of each of the first liquid crystal cells. The common electrodes Ec of the first liquid crystal cells are arranged opposite pixel electrodes Ep of the first liquid crystal cells in a horizontal direction. The pixel electrodes Ep of the first liquid crystal cells are connected to the data lines through data voltage supply switches TFT of the first liquid crystal cells.

The second longitudinal common line 320 is formed between two horizontally adjacent liquid crystal cells (hereinafter, referred to as "second liquid crystal cells"). The second longitudinal common line 320 is connected to common electrodes Ec of the second liquid crystal cells through a common voltage supply switch TFT' of each of the second liquid crystal cells. The common electrodes Ec of the second liquid crystal cells are arranged opposite pixel electrodes Ep of the second liquid crystal cells in a horizontal direction. The pixel electrodes Ep of the second liquid crystal cells are connected to the data lines through data voltage supply switches TFT of the second liquid crystal cells.

When a resolution of the liquid crystal cell array of FIG. 15 is m×n, m data lines and 3n gate lines are required. The gate pulse of ⅓ horizontal period synchronized with the data voltage is sequentially supplied to the gate lines of the liquid crystal cell array of FIG. 15.

As described above, the liquid crystal display according to the exemplary embodiment of the invention can greatly reduce the distortion of the common voltage by optimally arranging the common lines and by simultaneously switching on or off the data voltage and the common voltage using the data voltage supply switches and the common voltage supply switches.

Furthermore, the liquid crystal display according to the exemplary embodiment of the invention can reduce the power consumption, the number of data driver ICs, and the chip size, improve the response time, increase the driving margin of the liquid crystals, and reduce the heat generation in the data driver ICs without a reduction in the image quality by swing the common voltage under the conditions capable of stabilizing the common voltage.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:

a liquid crystal display panel on which a plurality of first units each including at least one liquid crystal cell and a plurality of second units each including at least one liquid crystal cell are positioned in a display area and a plurality of data line and a plurality of gate lines cross one another;

a common voltage generation unit configured to generate a first common voltage and a second common voltage;

a plurality of first longitudinal common lines configured to supply the first common voltage input through a plurality of first input units to each of first common electrodes of the plurality of first units; and a plurality of second longitudinal common lines configured to supply the second common voltage input through a plurality of second input units to each of second common electrodes of the plurality of second units, a plurality of source tape carrier packages (TCPs) on which data driver integrated circuits (ICs) for driving the data lines are respectively mounted, wherein the first input units include a dummy channel at one side of each of the plurality of source TCPs, wherein the second input units include a dummy channel at the other side of each of the plurality of source TCPs, wherein each of the plurality of first longitudinal common lines is connected to at least one of the first common electrodes through a first thin film transistor (TFT), wherein each of the plurality of second longitudinal common lines is connected to at least one of the second common electrodes through a second TFT.

2. The liquid crystal display of claim 1, wherein the first common voltage and the second common voltage are swung in opposite directions every predetermined period of time.

3. The liquid crystal display of claim 2, wherein the predetermined period of time is k horizontal period, where k is a natural number.

4. The liquid crystal display of claim 1, wherein the first common electrodes that are not directly connected to the first TFT are electrically connected to the at least one first common electrode directly connected to the first TFT, wherein the second common electrodes that are not directly connected to the second TFT are electrically connected to the at least one second common electrode directly connected to the second TFT.

5. The liquid crystal display of claim 1, wherein the first and second longitudinal common lines are formed in a direction parallel to the data lines.

6. The liquid crystal display of claim 1, further comprising:

a first edge common line configured to be formed in a non-display area outside the display area of the liquid crystal display panel and configured to electrically connect the first input units to the first longitudinal common lines; and a second edge common line configured to be formed independently of the first edge common line in the non-display area and configured to electrically connect the second input units to the second longitudinal common lines.

7. The liquid crystal display of claim 6, wherein the first and second edge common lines are formed using the same metal pattern as the gate lines, wherein the first and second longitudinal common lines are formed using the same metal pattern as the data lines.

8. The liquid crystal display of claim 6, wherein the first and second edge common lines each have a line width greater than the gate lines, wherein the first and second longitudinal common lines each have a line width less than the data lines.

9. The liquid crystal display of claim 1, further comprising:

a storage line configured to cross the first and second longitudinal common lines at a right angle in the liquid crystal cells of the first and second units and configured to receive a voltage of a constant level; and a shield pattern configured to extend from the storage line along the data lines or the first and second longitudinal common lines in an outside area of the liquid crystal cells of the first and second units.

10. The liquid crystal display of claim 1, wherein when a resolution of a liquid crystal cell array including the liquid crystal cells of the first and second units is m×n, where m and n are a natural number, 3m/2 data lines and 2n gate lines are formed on the liquid crystal display panel, wherein a gate pulse having a width corresponding to ½ horizontal period synchronized with a data voltage is sequentially supplied to the gate lines.

11. The liquid crystal display of claim 1, wherein when a resolution of a liquid crystal cell array including the liquid crystal cells of the first and second units is m×n, where m and n are a natural number, m data lines and 3n gate lines are formed on the liquid crystal display panel, wherein a gate pulse having a width corresponding to ⅓ horizontal period synchronized with a data voltage is sequentially supplied to the gate lines.

* * * * *